United States Patent [19]
Takamizawa et al.

[11] 3,928,327
[45] Dec. 23, 1975

[54] AROYL ALKYLEDENE THIAZOLINES

[75] Inventors: Akira Takamizawa, Ibaraki; Hiroshi Harada, Toyonaka, both of Japan

[73] Assignee: Shionogi & Co., Ltd., Osaka, Japan

[22] Filed: Sept. 24, 1974

[21] Appl. No.: 509,354

[30] Foreign Application Priority Data
Dec. 14, 1973  Japan.............................. 48-140766

[52] U.S. Cl......... 260/240 J; 260/306.7; 260/251 R
[51] Int. Cl.²...... C07D 239/04; C07D 277/10; C07D 417/04
[58] Field of Search...................... 260/240 J, 306.7

[56] References Cited
UNITED STATES PATENTS

| | | | |
|---|---|---|---|
| 3,536,727 | 10/1970 | Cavalla et al. | 260/306.7 R X |
| 3,813,360 | 5/1974 | Evans | 260/240 J X |

FOREIGN PATENTS OR APPLICATIONS

| | | | |
|---|---|---|---|
| 275,684 | 5/1964 | Australia | 260/306.7 |
| 274,013 | 4/1964 | Australia | 260/306.7 |
| 287,940 | 3/1965 | Netherlands | 260/306.7 |

Primary Examiner—Allen B. Curtis
Attorney, Agent, or Firm—Wenderoth, Lind & Ponack

[57] ABSTRACT

Thiazoline derivatives of the general formula:

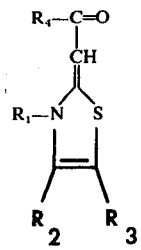

wherein $R_1$ is a lower alkyl group, lower alkenyl group, lower alkynyl group, aralkyl group or (4-amino-2-methyl-5-pyrimidinyl)methyl group, $R_2$ is a hydrogen atom or lower alkyl group, $R_3$ is a hydrogen atom or aryl group, and $R_4$ is an aryl group, being useful as medicaments exhibiting analgesic and anti-inflammatory actions which can be produced by reaction of 2-methylthiazolium derivatives with aroylphosphonates.

27 Claims, No Drawings

AROYL ALKYLEDENE THIAZOLINES

The present invention relates to novel thiazoline derivatives and production thereof. More particularly, it relates to pharmacologically valuable aroylidene derivatives of thiazolines represented by the general formula:

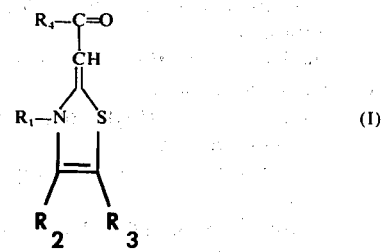

wherein $R_1$ represents a member selected from the group consisting of lower alkyl groups of up to 5 carbon atoms, lower alkenyl groups of up to 5 carbon atoms, lower alkynyl groups of up to 5 carbon atoms, aralkyl groups of 7 – 9 carbon atoms and (4-amino-2-methyl-5-pyrimidinyl)methyl group; $R_2$ represents a member selected from the group consisting of hydrogen atom and lower alkyl group of up to 5 carbon atoms; $R_3$ represents a member selected from the group consisting of hydrogen atom and phenyl group; $R_4$ represents a substituted or unsubstituted aryl group of 6 – 10 carbon atoms.

According to the present invention, the objective thiazoline derivatives represented by the general formula (I) can be produced by reacting a thiazolium salt represented by the general formula:

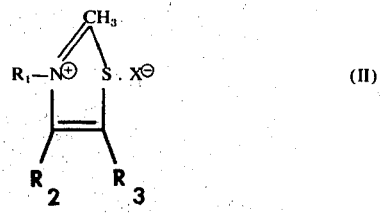

(wherein $R_1$, $R_2$ and $R_3$ each has the same meaning as mentioned above; X represents an acid radical) with a dialkyl aroylphosphate represented by the general formula:

(wherein $R_4$ has the same meaning as mentioned above; $R_5$ represents a lower alkyl group of up to 5 carbon atoms)

An analogous type of compound, i.e., 2-(3,4,5-trimethyl-4-thiazolin-2-ylidene)acetophenone (in the general formula (I), $R_1 = R_2 = R_3$ = methyl, $R_4$ = phenyl), has been described in Rev. Roumanie Chim., 9, 375–381 (1964). (Chem. Abst., 62, 6469b). The process to the compound indicated in the reference is quite different from that of the present invention, and moreover, the pharmacological activity has not been mentioned therein. The present invention provides new and valuable compounds having said pharmacological actions and a process for producing them.

In the aforementioned general formulae (I) – (III), $R_1$ means lower alkyl groups of up to 5 carbon atoms such as methyl, ethyl, n-propyl, isopropyl, n-butyl, s-butyl, n-pentyl and the like, lower alkenyl groups of up to 5 carbon atoms such as allyl, 2-butenyl, 2-methyl-2-propenyl, 2-pentenyl, 3-methyl-2-butenyl and the like, lower alkynyl groups of up to 5 carbon atoms such as propargyl, 2-butynyl, 2-pentynyl and the like, aralkyl groups of 7 – 9 carbon atoms such as benzyl, phenethyl, phenylpropyl and the like or (4-amino-2-methyl-5-pyrimidinyl)methyl group; $R_2$ means hydrogen atom or lower alkyl groups of up to 5 carbon atoms such as methyl, ethyl, n-propyl, isopropyl, n-butyl, s-butyl, n-pentyl and the like; $R_3$ means hydrogen atom or phenyl group; $R_4$ means a substituted or unsubstituted aryl group of 6 – 10 carbon atoms, more particularly phenyl or naphthyl which may be substituted by a substituent or substituents such as halogen atom (i.e. fluorine, chlorine, bromine, iodine), alkyl group (e.g. methyl, ethyl), alkoxy group (e.g. methoxy, ethoxy, methylenedioxy, ethylenedioxy), hydroxy group, nitro group, nitroso group, amino group and the like; $R_5$ means a lower alkyl group of up to 5 carbon atoms such as methyl, ethyl, n-propyl, isopropyl, n-butyl, s-butyl, n-pentyl and the like; and X means an acid radical such as halogen (e.g. iodine, bromine, chlorine), sulfonic acid radical, sulfuric acid radical, perchloric acid radical and the like.

The starting 2-methylthiazolium salts (II) used in the present invention may readily be prepared by the N-alkylation of the corresponding known 2-methylthiazoles [for example, referred to J. Chem. Soc., 121, 455 (1922); Ann., 250, 257 (1889); Chem. Ber., 69, 217 (1936)]. The dialkyl aroylphosphonates (III) are also known compounds [for example, referred to Chem. Pharm. Bull., Japan, 15, 1183 (1967)].

Representative of the starting 2-methylthiazolium salts (II) are:
2,3-dimethylthiazolium iodide,
2,3,4-trimethylthiazolium iodide,
3-ethyl-2-methylthiazolium iodide,
2-methyl-3-n-propylthiazolium bromide,
3-n-butyl-2-methylthiazolium bromide,
2,4-dimethyl-3-n-propylthiazolium iodide,
3-ethyl-2-methyl-4-n-propylthiazolium iodide,
3-benzyl-2,4-dimethylthiazolium bromide,
3-benzyl-2-methylthiazolium bromide,
3-benzyl-4-ethyl-2-methylthiazolium bromide,
2,4-dimethyl-3-phenethylthiazolium iodide,
5-phenyl-2,3,4-trimethylthiazolium iodide,
3-allyl-2-methylthiazolium bromide,
3-allyl-2,4-dimethylthiazolium bromide,
2,3-dimethyl-5-phenylthiazolium bromide,
2-methyl-3-propargylthiazolium bromide,
2,4-dimethyl-3-propargylthiazolium bromide, and
2-methyl-3-(2-methyl-4-amino-5-pyrimidinyl)methylthiazolium bromide.

Representative of the dialkyl aroylphosphonates (III) are:
dimethyl benzoylphosphonate,
diethyl benzoylphosphonate,
diethyl o-, m- or p-toluoylphosphonate,
diethyl 2,4-dimethylbenzoylphosphonate,
diethyl 3,4,5-trimethylbenzoylphosphonate,
diethyl o-, m- or p-fluorobenzoylphosphonate,
diethyl o-, m- or p-chlorobenzoylphosphonate, diethyl o-, m- or p-bromobenzoylphosphonate,
diethyl 3,4-dichlorobenzoylphosphonate,
diethyl o-, m- or p-methoxybenzoylphosphonate,
diethyl 3,4-dimethoxybenzoylphosphonate,
diethyl 3,4-methylenedioxybenzoylphosphonate,
diethyl o-, m- or p-nitrobenzoylphosphonate,
diethyl 2,4-dinitrobenzoylphosphonate,
diethyl o-, m- or p-aminobenzoylphosphonate, and
diethyl α- or β-naphthoylphosphonate.

According to the present invention, the reaction is usually carried out in an inert solvent under cooling (usually −50°C to 0°C, more particularly −35°C to −10°C) or at room temperature in the presence of a basic catalyst. The said inert solvent means an aprotic solvent in which the starting thiazolium salts and the phosphonates are soluble, for example, dimethylformamide (DMFA), dimethylsulfoxide (DMSO), hexamethylphosphoric triamide (HMPT). The preferred basic catalysts are inorganic bases such as alkali metal hydrides or amides (e.g., sodium hydride, lithium hydride, sodium amide, lithium amide, potassium amide), and organic bases such as amines or their alkali metal amides (e.g., triethylamine, pyridine, collidine, lithium diisopropylamide, lithium diethylamide) and bicyclic amidines (e.g., 1,5-diazabicyclo[3,4,0]nonene-5, 1,5-diazabicyclo[5,4,0]undecene-5). The reaction time is variable depending on the kind of the reactants and the reaction condition (temperature, solvent, base, etc.), and the reaction usually terminates within a period of several hours (i.e., 2 – 10 hours, more particularly 3 – 7 hours).

The resulting reaction product may readily be isolated from the reaction mixture and purified in the conventional manners, such as extraction, evaporation, distillation, chromatography, recrystallization, and the like.

The objective compounds (I) prepared in the present invention may also be represented by the general formula (I') as a resonance form.

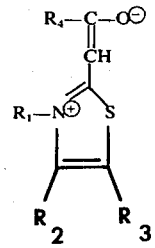

(I')

(wherein $R_1$, $R_2$, $R_3$ and $R_4$ each has the same meaning as mentioned above)

Representative of the objective compounds (I) are:
2-(3,4-dimethyl-4-thiazolin-2-ylidene)acetophenone,
2-(3-methyl-4-thiazolin-2-ylidene)acetophenone,
2-(3-benzyl-4-methyl-4-thiazolin-2-ylidiene)acetophenone,
2-(3-benzyl-4-thiazolin-2-ylidene)acetophenone,
4'-chloro-2-(3-methyl-4-thiazolin-2-ylidene)acetophenone,
4'-chloro-2-(3,4-dimethyl-4-thiazolin-2-ylidene)acetophenone,
4'-bromo-2-(3,4-dimethyl-4-thiazolin-2-ylidene)acetophenone,
3'-bromo-2-(3,4-dimethyl-4-thiazolin-2-ylidene)acetophenone,
2-(3,4-dimethyl-4-thiazolin-2-ylidene)-4'-methylacetophenone,
2-(3,4-dimethyl-4-thiazolin-2-ylidene)-3'-methylacetophenone,
2-(3,4-dimethyl-4-thiazolin-2-ylidene)-2'-methylacetophenone,
2-(3,4-dimethyl-4-thiazolin-2-ylidene)-4'-methoxyacetophenone,
2-(3,4-dimethyl-4-thiazolin-2-ylidene)-2'-methoxyacetophenone,
2'-methyl-2-(3-methyl-4-thiazolin-2-ylidene)acetophenone,
4'-methoxy-2-(3-methyl-4-thiazolin-2-ylidene)acetophenone,
2'-methoxy-2-(3-methyl-4-thiazolin-2-ylidene)acetophenone,
3'-methyl-2-(3-methyl-4-thiazolin-2-ylidene)acetophenone,
4'-methyl-2-(3-methyl-4-thiazolin-2-ylidene)acetophenone,
3'-bromo-2-(3-methyl-4-thiazolin-2-ylidene)acetophenone,
4'-bromo-2-(3-methyl-4-thiazolin-2-ylidene)acetophenone,
4'-fluoro-2-(3-methyl-4-thiazolin-2-ylidene)acetophenone,
3',4'-dichloro-2-(3-methyl-4-thiazolin-2-ylidene)acetophenone,
2-(3-allyl-4-thiazolin-2-ylidene)acetophenone,
2-(3-allyl-4-thiazolin-2-ylidene)-4'-chloroacetophenone,
2-(3-allyl-4-thiazolin-2-ylidene)-4'-methylacetophenone,
2-(3-propargyl-4-thiazolin-2-ylidene)acetophenone,
4'-chloro-2-(3-propargyl-4-thiazolin-2-ylidene)acetophenone,
4'-methyl-2-(3-propargyl-4-thiazolin-2-ylidene)acetophenone,
2-[3-(4-amino-2-methyl-5-pyrimidinyl)methyl-4-thiazolin-2-ylidene]acetophenone,
2-[3-(4-amino-2-methyl-5-pyrimidinyl)methyl-4-methyl-4-thiazolin-2-ylidene]acetophenone,
2-(3-methyl-5-phenyl-4-thiazolin-2-ylidene)acetophenone, and
2-(3-methyl-4-thiazolin-2-ylidene)-2'-acetonaphthone.

The following table indicates the activities of the representative compound of the present invention, i.e. 2-(3-methyl-4-thiazolin-2-ylidene)acetophenone (hereinafter referred to C-40542), in comparison with those of commercially available analgesic and anti-inflammatory agents, aminopyrine and phenylbutazone.

Table

| Assay item | Drug (mg/kg) | Amino-pyrine | Phenyl-butazone | C-40542 |
|---|---|---|---|---|
| PQ-Writhing | $ED_{50}$ | 107 | 385 | 55 |
| R & S (yeast) | 100% | 93 | 120 | 69 |
| Arthritis | 30% | 140 | 9 | 9 |
| Anti-edema | 30% | 50 | 48 | 27 |
| Acute toxicity | $LD_{50}$ | 1390 | 874 | 750 |

Note:
PQ = phenylquinone;
R & S = Randall & Selitto method;
All compounds were administered orally.

Test Method
1. PQ-Writhing (Analgesic activity):

DS-mice (15 – 17 g body weight, male and female) are treated with an intraperitoneal injection of 0.2 mg/10 g of 0.02 percent phenylquinone solution as a writhing inducer and kept in an individual observation cage for 15 minutes after the administration of phenylquinone. In the control mice, the writhing syndrome occurs about 10 times during this period of time. When the mice treated with a test compound do not show this syndrome for a period of 15 minutes, the test compound can be estimated to have an analgesic activity. The $ED_{50}$ is calculated by the up-and-down method of Brownlee et al [Fed. Proc., 18, 412 (1959)].

2. R & S (yeast) (Analgesic activity):

Brewer's Yeast (20 percent suspension, 0.1 ml) is applied subcutanesously to soles of the hind legs of rats to produce edema. After the lapse of 120 minutes from the application, a tenderness is given to the feet by means of an analgesymeter, and the pain threshold is determined as the value when the rats struggle to free themselves from the pain.

3. Arthritis (Adjuvant) (Anti-inflammation):

A suspension of 0.5 mg of dead organism of Mycobacterium tuberculosis in liquid paraffin is applied subcutaneously to the tails of rats.

After the lapse of 21 days, those wherein the typical arthritis occurs in the joints of the hind legs are selected and eight of them are used as 1 group. The test compound is orally administered to these rats twice a day, 5 times in all, and after the lapse of 5 hours from the final administration, the volume of edema occurring in the joints is measured by means of a volumeter.

4. Anti-edema (Carrageenin) (Anti-inflammation):

The anti-inflammatory activity is determined by measuring the thickness of an inflamed foot produced by the injection of 0.1 ml of 1 percent carrageenin. The thickness is measured by a microdial gauge. The detailed procedures for evaluation are as follows: First day, the swelling of left hind foot is measured without administration of any test compound. This value is used as control. Second day, another foot is used for the test in order to estimate the potency of the test compound. The anti-inflammatory activity of the test compound is determined by comparting the degree of swelling of both feet and expressed as percentage of inhibition [Benitz et al., Arch. int. Pharmacodyn., 144, 185 (1963)].

5. Acute toxicity:

Ten DS-mice (15 – 17 g body weight, male and female) in every group are used in the test at each dose level. Each assay compound is tested in 4 to 5 doses. The mortality is counted during a period of 72 hours after the administration of the test compound. The $LD_{50}$ is calculated by the Bliss' method.

As indicated above, the thiazoline derivatives of the general formula (I) show more potent analgesic and anti-inflammatory actions than the commercially available analgesic and anti-inflammatory agents, aminopyrine and phenylbutazone.

When the thiazoline derivatives (I) prepared in this invention are employed as analgesic or anti-inflammatory agents, they may be administered alone or in combination with pharmaceutically acceptable carriers, the proportion of which is determined by the solubility and chemical property of the compounds, chosen route of administration, and standard pharmaceutical practice. For example, they may be formulated with suitable excipients in the form of tablets or capsules for oral administration and can be administered in single or divided doses containing 50 – 1,500 mg of the active ingredient a day. They may also be applied parenterally to human adults, that is intramuscularly, intravenously or subcutaneously, at a dose of 10 – 300 mg in the form of a sterile aqueous solution containing 0.1 to 2 % of the active ingredient in a solute such as saline or glucose to make the solution isotonic.

The invention will be better explained by the following examples which are not intended as a limitation thereof.

EXAMPLE

To a suspension of 10 mmole of 2,3-dimethylthiazolium iodide and 11 mmole of diethyl benzoylphosphonate in 20 ml of dry dimethylformamide is added dropwise a solution of 15 mmole of 1,5-diazabicyclo[5,4,0]undecene-5 in 6 ml of dimethylformamide in nitrogen atmosphere, and the mixture is stirred at −20° – −15°C for 2 hours and then at room temperature for 3 hours, and allowed to stand overnight at room temperature. Solvent is removed by distillation under reduced pressure at 60°C, and water is added to the residue and extracted with ethyl acetate. The extract is dried over anhydrous sodium sulfate and evaporated to dryness. The residue is dissolved in chloroform and passed through a column of silica gel (3 cm in diameter, 5 cm long). The chloroform elution is evaporated to dryness, and the residue is recrystallized from ethyl acetate to give 1.43 g of 2-(3-methyl-4-thiazolin-2-ylidene)acetophenone as pale yellow needles having mp. 149° C. Yield 66 percent. UV: $\lambda_{max}^{EtOH}$ nm ($\epsilon$) 246 (9,350) and 381 (24,930). NMR: $\delta$ (CDCl$_3$) ppm 3.48 (3H, singlet, N-CH$_3$), 6.35 (1H, broad, =C-H), 6.35 and 6.78 (2H, AB quartet, J=4.1 Hz, H-C=C-H), 7.30 – 8.03 (5H, multiplet, aromatic ring). Anal. Calcd. for C$_{12}$H$_{11}$NOS (%): C, 66.33; H, 5.10, N, 6.45; S, 14.76. Found (%): C, 66.19; H, 4.85; N, 6.32; S, 14.69.

The following compounds can be produced in the same manner as mentioned above.

1. 2-(3,4-Dimethyl-4-thiazolin-2-ylidene)acetophenone (I: R$_1$ = R$_2$ = CH$_3$; R$_3$ = H; R$_4$ = Ph) from 2,3,4-trimethylthiazolium iodide and diethyl benzoylphosphonate. Mp. 175°C. UV: $\lambda_{max}^{EtOH}$ nm ($\epsilon$) 237 (9,470) and 385 (25,790). NMR: $\delta$(CDCl$_3$) ppm 2.20 (3H, doublet, J = 1.2 Hz, =C-CH$_3$), 3.43 (3H, singlet, N-CH$_3$), 6.09 (1H, quartet, J = 1.2 Hz,

6.32 (1H, broad, =C-H), 7.30 - 8.05 (5H, multiplet, aromatic ring). Anal. Calcd. for C$_{13}$H$_{13}$NOS (%): C, 67.50; H, 5.66; N, 6.06; S, 13.86. Found (%): C, 67.78; H, 5.64; N, 6.35; S, 13.78.

2. 2-(3-Benzyl-4-methyl-4-thiazolin-2-ylidene)acetophenone (I: R$_1$ = PhCH$_2$; R$_2$ = CH$_3$; R$_3$ = H; R$_4$ = Ph) from 3-benzyl-2,4-dimethylthiazolium bromide and diethyl benzoylphosphonate. Mp. 157°C. UV: $\lambda_{max}^{EtOH}$ nm ($\epsilon$) 233 (12,590), 251 (shoulder, 10,070) and 387 (28,450). NMR: $\delta$ (CDCl$_3$) ppm 2.18 (3H, doublet, J = 1.0 Hz, =C-CH$_3$), 5.13 (2H, singlet, PhCH$_2$), 6.18 (1H, quartet, J = 1.0 Hz, C=C-H), 6.30 (1H, broad, =C-H), 6.96 - 7.96 (10H, multiplet, aromatic ring). Anal. Calcd. for C$_{19}$H$_{17}$NOS (%): C, 74.24; H, 5.57; N, 4.56; S, 10.43. Found (%): C, 74.12; H, 5.58; N, 4.79; S, 11.03.

3. 2-(3-Benzyl-4-thiazolin-2-ylidene)acetophenone (I: $R_1 = PhCH_2$; $R_2 = R_3 = H$; $R_4 = Ph$) from 3-benzyl-2-methylthiazolium bromide and diethyl benzoylphosphonate. MP. 117°C. UV: $\lambda_{max}^{EtOH}$ nm ($\epsilon$) 245 (10,150) and 382 (26,860). NMR: $\delta$ (CDCl$_3$) ppm 5.08 (2H, singlet, PhCH$_2$), 6.37 (1H, broad, =C-H), 6.74 and 6.86 (2H, AB quartet, J = 4.8 Hz, H-C=C-H), 7.05 – 7.97 (10H, multiplet, aromatic ring). Anal. Calcd. for $C_{18}H_{15}NOS$ (%): C, 73.69; H, 5.15; N, 4.77; S, 10.93. Found (%): C, 73.97; H, 5.14; N, 5.01; S, 11.10.

4. 2-[3-(4-Amino-2-methyl-5-pyrimidinyl)methyl-4-thiazolin-2-ylidene]acetophenone [I: $R_1$ = (4-amino-2-methyl-5-pyrimidinyl)methyl; $R_2 = R_3 = H$; $R_4 = Ph$] from 3-(4-amino-2-methyl-5-pyrimidinyl)methyl-2-methylthiazolium bromide hydrobromide and diethyl benzoylphosphonate. Mp. 245°C (decomp). UV: $\lambda_{max}^{MeOH}$ nm ($\epsilon$) 236 (18,240), 275 (6,710) and 381 (24,210). NMR: $\delta$ (DMSO-d$_6$) ppm 2.32 (3H, singlet, Pyr-2-CH$_3$), 5.12 (2H, singlet, Pyr-CH$_2$), 6.63 (1H, singlet, =C-H), 6,82 (1H, doublet, J = 4.8 Hz, 4-H or 5-H in the thiazoline ring), 6.95 (2H, broad, NH$_2$), 7.34 – 8.05 (7H, multiplet, aromatic ring, pyrimidine ring and thiazoline ring). Anal. Calcd. for $C_{17}H_{16}N_4OS$ (%): C, 62.94; H, 4.97; N, 17.27; S, 9.88. Found (%): C, 62.26; H, 5.15; N, 17,14; S, 9.62.

5. 2-[3-(4-Amino-2-methyl-5-pyrimidinyl)methyl-4-methyl-4-thiazolin-2-ylidene]acetophenone [I: $R_1$ = (4-amino-2-methyl-5-pyrimidinyl)methyl; $R_2 = CH_3$; $R_3 = H$; $R_4 = Ph$] from 3-(4-amino-2-methyl-5-pyrimidinyl)methyl- 2,4-dimethylthiazolium bromide hydrobromide and diethyl benzoylphosphonate. Mp. 254°C (decomp). UV: $\lambda_{max}^{MeOH}$ nm ($\epsilon$) 234 (17,900), 275 (shoulder, 6,000) and 385 (23,420). NMR: $\delta$ (DMSO-d$_6$) ppm 2.23 (3H, doublet, J = 0.8 Hz, =C-CH$_3$), 2.30 (3H, singlet, Pyr-CH$_3$), 5.12 (2H, singlet, Pyr-CH$_2$), 6.52 (1H, singlet, =C-H), 6.58 (1H, broad singlet, thiazoline-H), 7.00 (2H, singlet, NH$_2$), 7.18 (1H, singlet, Pyr-6-H), 7.25 – 8.00 (5H, multiplet, aromatic ring). Anal. Calcd. for $C_{18}H_{18}N_4OS$ (%): C, 63.88; H, 5.36; N, 16.55; S, 9,47. Found (%): C, 63.82; H, 5.52; N, 16.84; S, 9.74.

6. 4'-Chloro-2-(3-methyl-4-thiazolin-2-ylidene)acetophenone (I: $R_1 = CH_3$; $R_2 = R_3 = H$; $R_4$ = p-Cl-Ph) from 2,3-dimethylthiazolium iodide and diethyl p-chlorobenzoylphosphonate. Mp. 174°C. UV: $\lambda_{max}^{EtOH}$ nm ($\epsilon$) 251.5 (11,530) and 385 (25,770). NMR: $\delta$ (CDCl$_3$) ppm 3.57 (3H, singlet, N-CH$_3$), 6.33 (1H, broad, =C-H), 6.48 and 6.87 (2H, AB quartet, J = 4.5 Hz, thiazoline-4,5-H), 7.37 and 7.93 (4H, A$_2$B$_2$ quartet, J = 8.8 Hz, aromatic ring). Anal. Calcd. for $C_{12}H_{10}NOSCl$ (%): C, 57.26; H, 4.00; N, 5.56; S, 12.74; Cl, 14.08. Found (%): C, 57.23; H, 3.69; N, 5.39; S, 12.67; Cl, 14.23.

7. 4'-Chloro-2-(3,4-dimethyl-4-thiazolin-2-ylidene)acetophenone (I: $R_1 = R_2 = CH_3$; $R_3 = H$; $R_4$ = p-Cl-Ph) from 2,3,4-trimethylthiazolium iodide and diethyl p-chlorozoylphosphonate. Mp. 177°C. UV: $\lambda_{max}^{EtOH}$ nm ($\epsilon$) 213 (shoulder, 19,150), 249.5 (12.730) and 390 (28,430). NMR: $\delta$ (CDCl$_3$) ppm 2.23 (3H, doublet, J = 1.2 Hz, =C-CH$_3$), 3.45 (3H, singlet, N-CH$_3$), 6.15 (1H, quartet, J = 1.2 Hz, thiazoline-5-H), 6.27 (1H, broad singlet, =C-H), 7.36 and 7.90 (4H, A$_2$B$_2$ quartet, J = 8.8 Hz, aromatic ring). Anal. Calcd. for $C_{13}H_{12}NOSCl$ (%): C, 58.75; H, 4.55; N, 5.27; S, 12.06; Cl, 13.34. Found (%): C, 58.59; H, 4.38; N, 5.39; S, 12.20; Cl, 13.53.

8. 4'-Bromo-2-(3,4-dimethyl-4-thiazolin-2-ylidene)-acetophenone (I: $R_1 = R_2 = CH_3$; $R_3 = H$; $R_4$ = p-Br-Ph) from 2,3,4-trimethylthiazolium iodide and diethyl p-bromobenzoylphosphonate. Mp. 197°C. UV: $\lambda_{max}^{EtOH}$ nm ($\epsilon$) 214 (shoulder, 15,290), 253 (11,690) and 390 (24,1210). NMR: 24,120 (CDCl$_3$) ppm 2.23 (3H, doublet, J = 1.2 Hz, =C-CH$_3$), 3.46 (3H, singlet, N-CH$_3$), 6.15 (1H, quartet, J = 1.2 Hz, thiazoline-5-H), 6.28 (1H, broad singlet, =C-H), 7.50 and 7.84 (4H, A$_2$B$_2$ quartet, J = 8.8 Hz, aromatic ring). Anal. Calcd. for $C_{13}H_{12}NOSBr$ (%): C, 50.33; H, 3.90; N, 4.52; S, 10.34; Br, 25.76. Found (%): C, 50.50; H, 3.88; N, 4.58; S, 10.25; Br, 25.62.

9. 3'-Bromo-2-(3,4-dimethyl-4-thiazolin-2-ylidene)acetophenone (I: $R_1 = R_2 = CH_3$; $R_3 = H$; $R_4$ = m-Br-Ph) from 2,3,4-trimethylthiazolium iodide and m-bromobenzoylphosphonate. Mp. 185°C. UV: $\lambda_{max}^{EtOH}$ nm ($\epsilon$) 211.5 (27,480), 239 (shoulder, 9,000), 253 (shoulder, 6,320), 277 (shoulder, 2,400) and 390 (24,730). NMR: $\delta$ (CDCl$_3$) ppm 2.25 (3H, doublet, J = 1.2 Hz, =C-CH$_3$), 3.50 (3H, singlet, N-CH$_3$), 6.18 (1H, quartet, J = 1.2 Hz, thiazoline-5-H), 6.28 (1H, broad singlet, =C-H), 7.10 – 8.16 (4H, multiplet, aromatic ring). Anal. Calcd. for $C_{13}H_{12}NOSBr$ (percent): C, 50.33; H, 3.90; N, 4.52; S, 10.34; Br, 25.76. Found (percent): C, 50.58; H, 3.78: N, 4.66; S, 10.14; Br, 25.97.

10. 2-(3,4-Dimethyl-4-thiazolin-2-ylidene)-4'-methylacetophenone (I: $R_1 = R_2 = CH_3$; $R_3 = H$; $R_4$ = p-tolyl) from 2,3,4-trimethylthiazolium iodide and diethyl p-toluoylphosphonate. Mp. 229°C. UV: $\lambda_{max}^{EtOH}$ nm ($\epsilon$) 214 (shoulder, 18,000), 255 (11,020) and 385 (28,500). NMR: $\delta$ (CDCl$_3$) ppm 2.18 (3H, doublet, J = 1.2 Hz, =C-CH$_3$), 2.38 (3H, singlet, Ph-CH$_3$), 3.42 (3H, singlet, N-CH$_3$), 6.07 (1H, quartet, J = 1.2 Hz, thiazoline-5-H), 6.23 (1H, broad, =C-H), 7.19 and 7.87 (4H, A$_2$B$_2$ quartet, J = 8.4 Hz, aromatic ring). Anal. Calcd. for $C_{14}H_{15}NOS$ (percent): C, 68.54; H, 6.16; N, 5.71; S, 13.07. Found (percent): C, 68.69; H, 6.14; N, 5.84; S, 12.79.

11. 2-(3,4-Dimethyl-4-thiazolin-2-ylidene)-3'-methylacetophenone (I: $R_1 = R_2 = CH_3$; $R_3 = H$; $R_4$ = m-tolyl) from 2,3,4-trimethylthiazolium iodide and diethyl m-toluoylphosphonate. Mp. 185°C. UV: $\lambda_{max}^{EtOH}$ nm ($\epsilon$) 205 (26,100), 249.5 (9,550) and 385 (26,970). NMR: $\delta$ (CDCl$_3$) ppm 2.20 (3H, doublet, J = 1.1 Hz, =C-CH$_3$), 2.41 (3H, singlet, Ph-CH$_3$), 3.43 (3H, singlet, N-CH$_3$), 6.08 (1H, quartet, J = 1.1 Hz, thiazoline-5-H), 6.25 (1H, broad, =C-H), 7.18 – 7.86 (4H, multiplet, aromatic ring). Anal. Calcd. for $C_{14}H_{15}NOS$ (%): C, 68.54; H, 6.16; N, 5.71; S, 13.07. Found (%): C, 68.83; H, 6.08; N, 5.94; S, 13.01.

12. 2-(3,4-Dimethyl-4-thiazolin-2-ylidene)-2'-methylacetophenone (I: $R_1 = R_2 = CH_3$; $R_3 = H$; $R_4$ = o-tolyl) from 2,3,4-trimethylthiazolium iodide and diethyl o-toluoylphosphonate. Mp. 127°C. UV: $\lambda_{max}^{EtOH}$ nm ($\epsilon$) 203.5 (25,320), 245 (shoulder, 5,790) and 366 (25,580). NMR: $\delta$ (CDCl$_3$) ppm 2.24 (3H, doublet, J = 1.1 Hz, =C-CH$_3$), 2.51 (3H, singlet, Ph-CH$_3$), 3.42 (3H, singlet, N-CH$_3$), 5.98 (1H, broad, =C-H), 6.13 (1H, quartet, J = 1.1 Hz, thiazoline-5-H), 7.13 - 7.63 (4H, multiplet, aromatic ring). Anal. Calcd. for $C_{14}H_{15}NOS$ (%): C, 68.54; H, 6.16; N, 5.71; S, 13.07. Found (%): C, 68.26; H, 5.93; N, 5.89; S, 13.29.

13. 2-(3,4-Dimethyl-4-thiazolin-2-ylidene)-4'-methoxyacetophenone ($R_1 = R_2 = CH_3$; $R_3 = H$; $R_4$ = p-MeO-Ph) from 2,3,4-trimethylthiazolium iodide and diethyl p-methoxybenzoylphosphonate. Mp. 154°C.

UV: $\lambda_{max}^{EtOH}$ nm ($\epsilon$) 216.5 (18,400), 269 (10,410) and 385 (30,790). NMR: $\delta$ (CDCl$_3$) ppm 2.18 (3H, doublet, J = 1.2 Hz, =C-CH$_3$), 3.42 (3H, singlet, N-CH$_3$), 3.83 (3H, singlet, OCH$_3$), 6.07 (1H, quartet, J = 1.2 Hz, thiazoline-5H), 6.18 (1H, broad, =C-H], 6.91 and 7.95 (4H, A$_2$B$_2$ quartet, J = 9.0 Hz, aromatic ring). Anal. Calcd. for C$_{14}$H$_{15}$NO$_2$S (%): C, 64.34; H, 5.79; N, 5.36; S, 12.27. Found (%): C, 64.22; H, 5.66; N, 5.37; S, 12.10.

14. 2-(3,4-Dimethyl-4-thiazolin-2-ylidene)-2'-methoxyacetophenone (I: R$_1$ = R$_2$ = CH$_3$; R$_3$ = H; R$_4$ = o-MeO-Ph) from 2,3,4-trimethylthiazolium iodide and diethyl o-methoxybenzoylphosphonate. Mp. 144°C. UV: $\lambda_{max}^{EtOH}$ nm ($\epsilon$) 212 (25,480), 253 (shoulder, 5,400), 303 (2,200) and 382 (23,890). NMR: $\delta$ (CDCl$_3$) ppm 2.22 (3H, doublet, J = 1.2 Hz, =C-CH$_3$), 3.43 (3H, singlet, N-CH$_3$), 3.88 (3H, singlet, OCH$_3$), 6.10 (1H, quartet, J = 1.2 Hz, thiazoline-5-H), 6.49 (1H, broad, =C-H), 6.82 - 8.02 (4H, multiplet, aromatic ring). Anal. Calcd. for C$_{14}$H$_{15}$NO$_2$S (%): C, 64.34; H, 5.79; N, 5.36; S, 12.27. Found (%): C, 64.28; H, 5.77; N, 5.34; S, 12.25.

15. 2'-Methyl-2-(3-methyl-4-thiazolin-2-ylidene)acetophenone (I: R$_1$ = CH$_3$; R$_2$ = R$_3$ = H; R$_4$ = o-tolyl) from 2,3-dimethylthiazolium iodide and diethyl o-toluoylphosphonate. Mp. 151° - 153.5°C. UV: $\lambda_{max}^{EtOH}$ nm ($\epsilon$) 242 (shoulder, 6,530) and 362 (25,790). NMR: $\delta$ (CDCl$_3$) ppm 2.50 (3H, singlet, Ph-CH$_3$), 3.48 (3H, singlet, N-CH$_3$), 5.98 (1H, broad, =C-H), 6.42 and 6.82 (2H, AB quartet, J = 4.2 Hz, thiazoline-4,5-H), 7.08 - 7.58 (4H, multiplet, aromatic ring). Anal. Calcd. for C$_{13}$H$_{13}$NOS (%): C, 67.52; H, 5.67; N, 6.06. Found (%): C, 67.43; H, 5.66; N, 6.22.

16. 4'-Methoxy-2-(3-methyl-4-thiazolin-2-ylidene)acetophenone (I: R$_1$ = CH$_3$; R$_2$ = R$_3$ = H; R$_4$ = p-MeO-Ph) from 2,3-dimethylthiazolium iodide and diethyl p-methoxybenzoylphosphonate. Mp. 114° - 118°C. UV: $\lambda_{max}^{EtOH}$ nm ($\epsilon$) 271 (11,550) and 381 (31,450). NMR: $\delta$ (CDCl$_3$) ppm 3.52 (3H, singlet, N-CH$_3$), 3.83 (3H, singlet, OCH$_3$), 6.35 (1H, broad, =C-H), 6.39 and 6.79 (2H, AB quartet, J = 4.2 Hz, thiazoline-4,5-H), 6.92 and 7.95 (4H, A$_2$B$_2$ quartet, J = 8.9 Hz, aromatic ring). Anal. Calcd. for C$_{13}$H$_{13}$NO$_2$S (%): C, 63.15; H, 5.30; N, 5.67. Found (%): C, 63.24; H, 5.35; N, 5.81.

17. 2'-Methoxy-2-(3-methyl-4-thiazolin-2-ylidene)acetophenone (I: R$_1$ = CH$_3$; R$_2$ = R$_3$ = H; R$_4$ = o-MeO-Ph) from 2,3-dimethylthiazolium iodide and diethyl o-methoxybenzoylphosphonate. Mp. 129° - 131°C. UV: $\lambda_{max}^{EtOH}$ nm ($\epsilon$) 255 (shoulder, 5,430) and 377 (24,090). NMR: $\delta$ (CDCl$_3$) ppm 3.50 (3H, singlet, N-CH$_3$), 3.87 (3H, singlet, OCH$_3$), 6.45 (1H, broad, =C-H), 6.40 and 6.82 (2H, AB quartet, J = 4.2 Hz, thiazoline-4,5-H), 6.88 - 7.97 (4H, multiplet, aromatic ring). Anal. Calcd. for C$_{13}$H$_{13}$NO$_2$S (%): C, 63.15; H, 5.30; N, 5.67. Found (%): C, 62.55; H, 5.27; N, 5.78.

18. 3'-Methyl-2-(3-methyl-4-thiazolin-2-ylidene)acetophenone (I: R$_1$ = CH$_3$; R$_2$ = R$_3$ = H; R$_4$ = m-tolyl) from 2,3-dimethylthiazolium iodide and diethyl m-toluoylphosphonate. Mp. 151° - 155°C. UV: $\mu_{max}^{EtOH}$ nm ($\epsilon$) 250 (8,890) and 381 (29,100). NMR: $\delta$ (CDCl$_3$) ppm 2.40 (3H, singlet, CH$_3$), 3.53 (3H, singlet, N-CH$_3$), 6.35 (1H, broad, =C-H), 6.40 and 6.80 (2H, AB quartet, J = 4.2 Hz, thiazoline-4,5-H), 7.20 - 7.83 (4H, multiplet, aromatic ring). Anal. Calcd. for C$_{13}$H$_{13}$NOS (%): C, 67.52; H, 5.67; N, 6.06. found (%): C, 67.61; H, 5.71; N, 6.06. .

19. 4'-Methyl-2-(3-methyl-4-thiazolin-2-ylidene)-acetophenone (I: R$_1$ = CH$_3$; R$_2$ = R$_3$ = H; R$_4$ = p-tolyl) from 2,3-dimethylthiazolium iodide and diethyl p-toluoylphosphonate. Mp. 138° - 141°C. UV: $\lambda_{max}^{EtOH}$ nm ($\epsilon$) 255 (11,650) and 381 (29,960). NMR: $\delta$(CDCl$_3$) ppm 2.38 (3H, singlet, CH$_3$), 3.52 (3H, singlet, N-CH$_3$), 6.35 (1H, broad, =C-H), 6.40 and 6.80 (2H, AB quartet, J = 4.2 Hz, thiazoline-4,5-H), 7.22 and 7.87 (4H, A$_2$B$_2$ quartet, J = 8.2 Hz, aromatic ring). Anal. Calcd. for C$_{13}$H$_{13}$NOS (%): C, 67.52; H, 5.67; N, 6.06. Found (%): C, 67.44; H, 5.60; N, 6.10.

20. 3'-Bromo-2-(3-methyl-4-thiazolin-2-ylidene)acetophenone (I: R$_1$ = CH$_3$; R$_2$ = R$_3$ = H; R$_4$ = m-Br-Ph) from 2,3-dimethylthiazolium iodide and diethyl m-bromobenzoylphosphonate. Mp. 126° - 128°C. UV: $\lambda_{max}^{EtOH}$ nm ($\epsilon$) 245 (7,620) and 384 (22,420). NMR: $\delta$ (CDCl$_3$) ppm 3.58 (3H, singlet, N-CH$_3$), 6.33 (1H, broad, =C-H), 6.50 and 6.87 (2H, AB quartet, J = 4.2 Hz, thiazoline-4,5-H), 7.13 - 8.13 (4H, multiplet, aromatic ring). Anal. Calcd. for C$_{12}$H$_{10}$NOSBr (%): C, 48.66; H, 3.38; N, 4.73. Found (%): C, 48.77; H, 3.45; N, 4.72.

21. 4'-Bromo-2-(3-methyl-4-thiazolin-2-ylidene)acetophenone (I: R$_1$ = CH$_3$; R$_2$ = R$_3$ = H; R$_4$ = p-Br-Ph) from 2,3-dimethylthiazolium iodide and diethyl p-bromobenzoylphosphonate. Mp. 204° - 208°C. UV: $\lambda_{max}^{EtOH}$ nm ($\epsilon$) 255 (13,310) and 386 (27,330). NMR: $\delta$ (CDCl$_3$) ppm 3.57 (3H, singlet, N-CH$_3$), 6.30 (1H, broad, =C-H), 6.48 and 6.85 (2H, AB quartet, J = 4.2 Hz, thiazoline-4,5-H), 7.53 and 7.83 (4H, A$_2$B$_2$ quartet, J = 8.5 Hz, aromatic ring). Anal. Calcd. for C$_{12}$H$_{10}$NOSBr (%): C, 48.66; H, 3.38; N, 4.73. Found (%): C, 48.55; H, 3.44; N, 4.70.

22. 4'-Fluoro-2-(3-methyl-4-thiazolin-2-ylidene)acetophenone (I: R$_1$ = CH$_3$; R$_2$ = R$_3$ = H; R$_4$ = p-F-Ph) from 2,3-dimethylthiazolium iodide and diethyl p-fluorobenzoylphosphonate. Mp. 121° - 124°C. UV: $\lambda_{max}^{EtOH}$ nm ($\epsilon$) 247 (10,120) and 380 (26,490). NMR: $\delta$ (CDCl$_3$) ppm 3.56 (3H, singlet, N-CH$_3$), 6.30 (1H, broad, =C-H), 6.45 and 6.83 (2H, AB quartet, J = 4.2 Hz, thiazoline-4,5-H), 6.92 - 8.09 (4H, multiplet, aromatic ring). Anal. Calcd. for C$_{12}$H$_{10}$NOSF (%): C, 61.25; H, 4.28; N, 5.95. Found (%): C, 61.08; H, 4.49; N, 5.88.

23. 3',4'-Dichloro-2-(3-methyl-4-thiazolin-2-ylidene) acetophenone (I: R$_1$ = CH$_3$; R$_2$ = R$_3$ = H; R$_4$ = 3,4-dichloro-Ph) from 2,3-dimethylthiazolium iodide and diethyl 3,4-dichlorobenzoylphosphonate. Mp. 194° - 196°C. UV: $\lambda_{max}^{EtOH}$ nm ($\epsilon$) 250 (10,270) and 389 (23,050). NMR: $\delta$ (CDCl$_3$) ppm 3.60 (3H, singlet, N-CH$_3$), 6.22 (1H, broad, =C-H), 6.52 and 6.87 (2H, AB quartet, J = 4.2 Hz, thiazoline-4,5-H), 7.27 - 8.06 (3H, multiplet, aromatic ring). Anal. Calcd. for C$_{12}$H$_9$NOSCl$_2$ (%): C, 50.36; H, 3.14; N, 4.90. Found (%): C, 50.44; H, 3.23; N, 4.98.

24. 2-(3-Allyl-4-thiazolin-2-ylidene)acetophenone (I: R$_1$ = CH$_2$=CHCH$_2$; R$_2$ = R$_3$ = H; R$_4$ = Ph) from 3-allyl-2-methylthiazolium bromide and diethyl benzoylphosphonate. Mp. 70°C. UV: $\lambda_{max}^{EtOH}$ nm ($\epsilon$) 246.5 (9,500), 280 (shoulder, 2,050) and 382 (25,740). NMR: $\delta$(CDCl$_3$) ppm 4.52 (2H, doublet triplet, J = 5.0 Hz and 1.5 Hz, -CH$_2$N), 4.97 - 5.50 (2H, multiplet, =CH$_2$), 5.62 - 6.67 (2H, multiplet, 2 X -CH=), 6.48 and 6.86 (2H, AB quartet, J = 4.5 Hz, thiazoline-4,5-H), 7.25 - 8.12 (5H, multiplet, aromatic ring). Anal. Calcd. for C$_{14}$H$_{13}$NOS (%): C, 69.11; H, 5.39; N, 5.76; S, 13.18. Found (%): C, 69.08; H, 5.21; N, 5.88; S, 13.47.

25. 2-(3-Allyl-4-thiazolin-2-ylidene)-4'-chloroacetophenone (I: $R_1 = CH_2=CHCH_2$; $R_2 = R_3 = H$; $R_4 = $ p-Cl-Ph) from 3-allyl-2-methylthiazolium bromide and diethyl p-chlorobenzoylphosphonate. Mp. 97° – 98°C. UV: $\lambda_{max}^{EtOH}$ nm ($\epsilon$) 214 (shoulder, 16,470), 252 (12,120) and 386 (26,210). NMR: $\delta$ (CDCl$_3$) ppm 4.53 (2H, doublet triplet, J = 5.0 Hz and 1.5 Hz, -CH$_2$N), 4.97 - 5.50 (2H, multiplet, =CH$_2$), 5.63 - 6.67 (2H, multiplet, 2 X -CH=), 6.51 and 6.88 (2H, AB quartet, J = 4.5 Hz, thiazoline-4,5-H), 7.35 and 7.88 (4H, A$_2$B$_2$quartet, J = 8.5 Hz, aromatic ring). Anal. Calcd. for C$_{14}$H$_{12}$NOSCl (%): C, 60.54; H, 4.35; N, 5.04; S, 11.54; Cl, 12.76. Found (%): C, 60.50; H, 4.39; N, 5.05; S, 11.44; Cl, 12.80.

26. 2-(3-Allyl-4-thiazolin-2-ylidene)-4'-methylacetophenone (I: $R_1 = CH_2=CHCH_2$; $R_2 = R_3 = H$; $R_4 = $ p-tolyl) from 3-allyl-2-methylthiazolium bromide and diethyl p-toluoylphosphonate. Mp. 126° – 127°C. UV: $\lambda_{max}^{EtOH}$ nm ($\epsilon$) 216 (shoulder, 15,590), 255.5 (10.760 ) and 382 (28,300). NMR: $\delta$ (CDCl$_3$) ppm 2.38 (3H, singlet, Ph-CH$_3$), 4.51 (2H, doublet triplet, J = 5.0 Hz and 1.5 Hz, -CH$_2$N), 4.95 - 5.50 (2H, multiplet, =CH$_2$), 5.63 - 6.60 (2H, multiplet, 2 X -CH=), 6.45 and 6.84 (2H, AB quartet, J = 4.5 Hz, thiazoline-4,5-H), 7.20 and 7.85 (4H, A$_2$B$_2$ quartet, J = 8.0 Hz, aromatic ring). Anal. Calcd. for C$_{15}$H$_{15}$NOS (%): C, 70.01; H, 5.88; N, 5.44; S, 12.46. Found (%): 70.22; H, 5.61; N, 5.54; S, 12.37.

27. 2-(3-Propargyl-4-thiazolin-2-ylidene)acetophenone (I: $R_1 = CH \equiv CCH_2$; $R_2 = R_3 = H$; $R_4 = $ Ph) from 2-methyl-3-propargylthiazolium bromide and diethyl benzoylphosphonate. Mp. 154° – 156°C (decomp). UV: $\lambda_{max}^{EtOH}$ nm ($\epsilon$) 247.5 (9,160), 280 (shoulder, 1,970) and 381 (24,470). NMR: $\delta$ (CDCl$_3$) ppm 2.53 (1H, triplet, J = 2.5 Hz, HC $\equiv$ C), 4.62 (2H, doublet, J = 2.5 Hz, -CH$_2$N), 5.78 - 6.67 (1H, multiplet, -CH=), 6.45 and 7.03 (2H, AB quartet, J = 4.5 Hz, thiazoline-4,5-H), 7.30 – 8.12 (5H, multiplet, aromatic ring). Anal. Calcd. for C$_{14}$H$_{11}$NOS (%): C, 69.68; H, 4.59; N, 5.80; S, 13.29. Found (%): C, 69.50; H, 4.61; N, 5.93; S, 13.22.

28. 4'-Chloro-2-(3-propargyl-4-thiazolin-2-ylidene)acetophenone (I: $R_1 = CH \equiv CCH_2$; $R_2 = R_3 = H$; $R_4 = $ p-Cl-Ph) from 2-methyl-3-propargylthiazolium bromide and diethyl p-chlorobenzoylphosphonate. Mp. 171° – 172°C (decomp). UV: $\lambda_{max}^{EtOH}$ nm ($\epsilon$) 215 (shoulder, 17,040), 253.5 (12,560) and 387 (27,540). NMR: $\delta$ (CDCl$_3$) ppm 2.55 (1H, triplet, J = 2.5 Hz, HC $\equiv$ C), 4.64 (2H, doublet, J = 2.5 Hz, -CH$_2$N), 5.60 - 6.83 (1H, multiplet, -CH=), 6.49 and 7.07 (2H, AB quartet, J = 4.5 Hz, thiazoline-4,5-H), 7.37 and 7.90 (4H, A$_2$B$_2$ quartet, J = 8.5 Hz, aromatic ring). Anal. Calcd. for C$_{14}$H$_{10}$NOSCl (%): C, 60.98; H, 3.66; N, 5.08; S, 11.63; Cl, 12.86. Found (%): C, 60.70; H, 3.68; N, 5.00; S, 11.60; Cl, 12.92.

29. 4'-Methyl-2-(3-propargyl-4-thiazolin-2-ylidene)acetophenone (I: $R_1 = CH \equiv CCH_2$; $R_2 = R_3 = H$; $R_4 = $ p-tolyl) from 2-methyl-3-propargylthiazolium bromide and diethyl p-toluoylphosphonate. Mp. 167° – 172°C (decomp). UV: $\lambda_{max}^{EtOH}$ nm ($\epsilon$) 216 (shoulder, 15,300), 256.5 (11,210) and 382 (28,890). NMR: $\delta$ (CDCl$_3$) ppm 2.38 (3H, singlet, Ph-CH$_3$), 2.52 (1H, triplet, J = 2.5 Hz, HC $\equiv$ C), 4.59 (2H, doublet, J = 2.5 Hz, -CH$_2$N), 6.45 (1H, singlet, -CH=), 6.43 and 7.02 (2H, AB quartet, J = 5.0 Hz, thiazoline-4,5-H), 7.20 and 7.87 (4H, A$_2$B$_2$ quartet, J = 8.5 Hz, aromatic ring). Anal. Calcd. for C$_{15}$H$_{13}$NOS (%): C, 70.56; H, 5.13; N, 5.49; S, 12.56. Found (%): C, 70.69; H, 5.24; N, 5.19; S, 12.76.

30. 2-(3-Methyl-4-thiazolin-2-ylidene)-2'-acetonaphthone (I: $R_1 = CH_3$; $R_2 = R_3 = H$; $R_4 = $ 2-naphthyl) from 2,3-dimethylthiazolium iodide and diethyl 2-naphthoylphosphonate. Mp. 141°C. UV: 80$_{max}^{EtOH}$ nm ($\epsilon$) 214.5 (47,570), 244.5 (27,930), 253 (22,400), 276 (8,220), 285.5 (8,960), 300 (5,080) and 392 (28,360). NMR: $\delta$ (CDCl$_3$) ppm 3.53 (3H, singlet, N-CH$_3$), 6.42 and 6.78 (2H, AB quartet, J = 4.5 Hz, thiazoline-4,5-H), 6.48 (1H, singlet, -CH=), 7,37 - 8.20 (6H, multiplet, naphthalene-3,4,5,6,7,8-H), 8.47 (1H, broad singlet, naphthalene-1-H). Anal. Calcd. for C$_{16}$H$_{13}$NOS (%): C, 71.88; H, 4.90; N, 5.24; S, 11.99. Found (%): C, 72.04; H, 4.81; N, 5.27; S, 11.86.

31. 2-(3-Methyl-5-phenyl-4-thiazolin-2-ylidene)acetophenone (I: $R_1 = CH_3$; $R_2 =$H; $R_3 = R_4 = $ Ph) from 2,3-dimethyl-5-phenylthiazolium iodide and diethyl benzoylphosphonate. Mp. 215°C. UV: $\lambda_{max}^{EtOH}$ nm ($\epsilon$) 230 (8,350), 245 (shoulder, 6,840), 312 (4,580) and 401 (32,400). NMR: $\delta$ (CDCl$_3$) ppm 3.51 (3H, singlet, N-CH$_3$), 6.30 (1H, broad, =C-H), 6.96 (1H, singlet, thiazoline-4-H), 7.20 – 8.08 (10H, multiplet, 2 X aromatic ring). Anal. Calcd. for C$_{18}$H$_{15}$NOS (%): C, 73.70; H, 5.15; N, 4.78; S, 10.91. Found (%): C, 73.63; H, 5.15; N, 4.69; S, 10.97.

We claim:

1. A compound represented by the general formula:

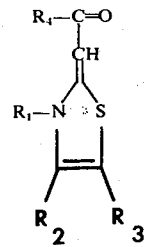

wherein $R_1$ represents a member selected from the group consisting of lower alkyl groups of up to 5 carbon atoms, lower alkenyl groups of up to 5 carbon atoms, lower alkynyl groups of up to 5 carbon atoms, aralkyl groups of 7 – 9 carbon atoms and (4-amino-2-methyl-5-pyrimidinyl)methyl group; $R_2$ represents a member selected from the group consisting of hydrogen atom and lower alkyl groups of up to 5 carbon atoms; $R_3$ represents a member selected from the group consisting of hydrogen atom and phenyl group; $R_4$ represents a member selected from the group consisting of unsubstituted aryl groups of 6 – 10 carbon atoms and substituted aryl groups of 6 – 10 carbon atoms.

2. A compound claimed in claim 1, wherein $R_1$ is a member selected from the group consisting of lower alkyl groups of up to 5 carbon atoms and aralkyl groups of 7 – 9 carbon atoms, $R_2$ is a member selected from the group consisting of hydrogen atom and lower alkyl groups of up to 5 carbon atoms, $R_3$ is a hydrogen atom, and $R_4$ is a member selected from the group consisting of phenyl group and substituted phenyl groups of 6 - 10 carbon atoms.

3. A compound claimed in claim 1, wherein $R_1$ is a lower alkyl group of up to 5 carbon atoms, $R_2$ and $R_3$ each is a hydrogen atom, and $R_4$ is a phenyl group.

4. A compound claimed in claim 1, namely 2-(3,4-dimethyl-4-thiazolin-2-ylidene)acetophenone.

5. A compound claimed in claim 1, namely 2-(3-methyl-4-thiazolin-2-ylidene)acetophenone.

6. A compound claimed in claim 1, namely 2-(3-benzyl-4-thiazolin-2-ylidene)acetophenone.

7. A compound claimed in claim 1, namely 4'-chloro-2-(3-methyl-4-thiazolin-2-ylidene)acetophenone.

8. A compound claimed in claim 1, namely 4'-chloro-2-(3,4-dimethyl-4-thiazolin-2-ylidene)acetophenone.

9. A compound claimed in claim 1, namely 4'-bromo-2-(3,4-dimethyl-4-thiazolin-2-ylidene)acetophenone.

10. A compound claimed in claim 1, namely 3'-bromo-2-(3,4-dimethyl-4-thiazolin-2-ylidene)acetophenone.

11. A compound claimed in claim 1, namely 2-(3,4-dimethyl-4-thiazolin-2-ylidene)-4'-methylacetophenone.

12. A compound claimed in claim 1, namely 2-(3,4-dimethyl-4-thiazolin-2-ylidene)-3'-methylacetophenone.

13. A compound claimed in claim 1, namely 2-(3,4-dimethyl-4-thiazolin-2-ylidene)-2'-methylacetophenone.

14. A compound claimed in claim 1, namely 2-(3,4-dimethyl-4-thiazolin-2-ylidene)-4'-methoxyacetophenone.

15. A compound claimed in claim 1, namely 2'-methyl-2-(3-methyl-4-thiazolin-2-ylidene)acetophenone.

16. A compound claimed in calim 1, namely 4'-methoxy-2-(3-methyl-4-thiazolin-2-ylidene)acetophenone.

17. A compound claimed in claim 1, namely 2'-methoxy-2-(3-methyl-4-thiazolin-2-ylidene)acetophenone.

18. A compound claimed in claim 1, namely 3'-methyl-2-(3-methyl-4-thiazolin-2-ylidene)acetophenone.

19. A compound claimed in claim 1, namely 3',4'-dichloro-2-(3-methyl-4-thiazolin-2-ylidene)acetophenone.

20. A compound claimed in claim 1, namely 2-(3-propargyl-4-thiazolin-2-ylidene)acetophenone.

21. A process for the production of compounds represented by the general formula:

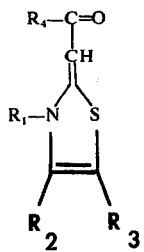

(wherein $R_1$ represents a member selected from the group consisting of lower alkyl groups of up to 5 carbon atoms, lower alkenyl groups of up to 5 carbon atoms, lower alkynyl groups of up to 5 carbon atoms, aralkyl groups of 7 – 9 carbon atoms and (4-amino-2-methyl-5-pyrimidinyl)methyl group; $R_2$ represents a member selected from the group consisting of hydrogen atom and lower alkyl groups of up to 5 carbon atoms; $R_3$ represents a member selected from the group consisting of hydrogen atom and phenyl group; $R_4$ represents a member selected from the group consisting of unsubstituted aryl groups of 6 - 10 carbon atoms and substituted aryl groups of 6 – 10 carbon atoms) which comprises reacting a thiazolium salt represented by the general formula:

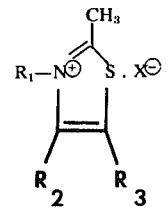

(wherein $R_1$, $R_2$ and $R_3$ each has the same meaning as mentioned above; X represents an acid radical) with a dialkyl aroylphosphonate represented by the general formula:

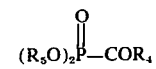

(wherein $R_4$ has the same meaning as mentioned above; $R_5$ represents a lower alkyl group of up to 5 carbon atoms).

22. A process claimed in claim 21, wherein the reaction is carried out in an inert solvent at a temperature ranging from −50°C to room temperature in the presence of a basic catalyst.

23. A process claimed in claim 22, wherein the solvent is an aprotic solvent.

24. A process claimed in claim 22, wherein the solvent is selected from the group consisting of dimethylformamide, dimethylsulfoxide, and hexamethylphosphoric triamide.

25. A process claimed in claim 22, wherein the reaction temperature is −50°C − 0°C.

26. A process claimed in claim 22, wherein the basic catalyst is selected from the group consisting of alkali metal hydrides, alkali metal amides, amines, alkali metal amides of amines and bicyclic amidines.

27. A process claimed in claim 22, wherein the basic catalyst is selected from the group consisting of sodium hydride, lithium hydride, sodium amide, lithium amide, potassium amide, triethylamine, pyridine, collidine, lithium diisopropylamide, lithium diethylamide, 1,5-diazabicyclo[3,4,0]nonene-5 and 1,5-diazabicyclo[5,4,0]undecene-5.

* * * * *